Jan. 17, 1928.
J. M. SARGEANT
Re. 16,853
APPARATUS FOR CONSTRUCTING THIN CONCRETE WALLS AND ERECTING THE SAME
Original Filed April 18, 1925 3 Sheets-Sheet 1
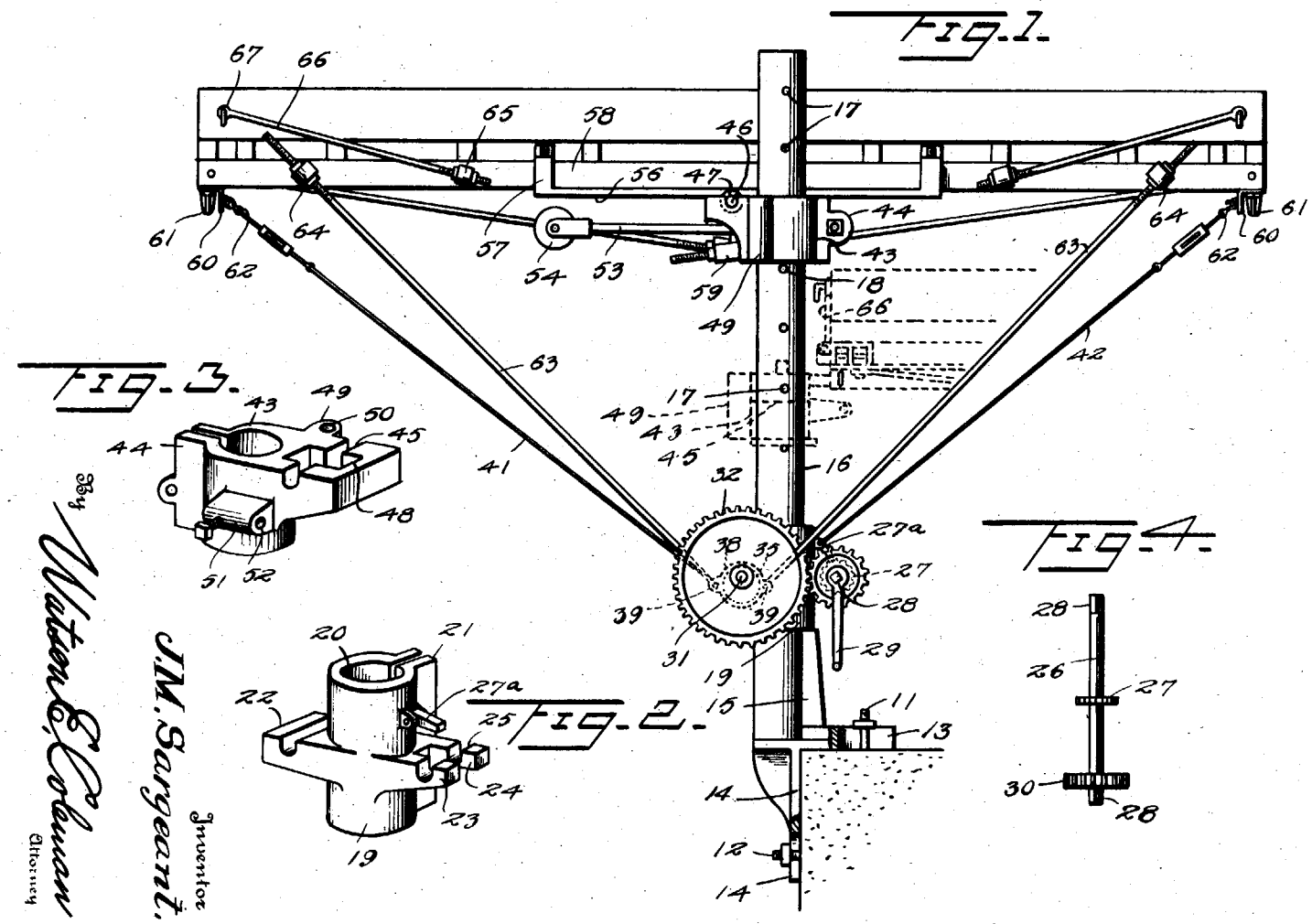
Inventor
J.M. Sargeant.
By Watson E. Coleman
Attorney Jan. 17, 1928. Re. 16,853
J. M. SARGEANT
APPARATUS FOR CONSTRUCTING THIN CONCRETE WALLS AND ERECTING THE SAME
Original Filed April 18, 1925 3 Sheets-Sheet 2
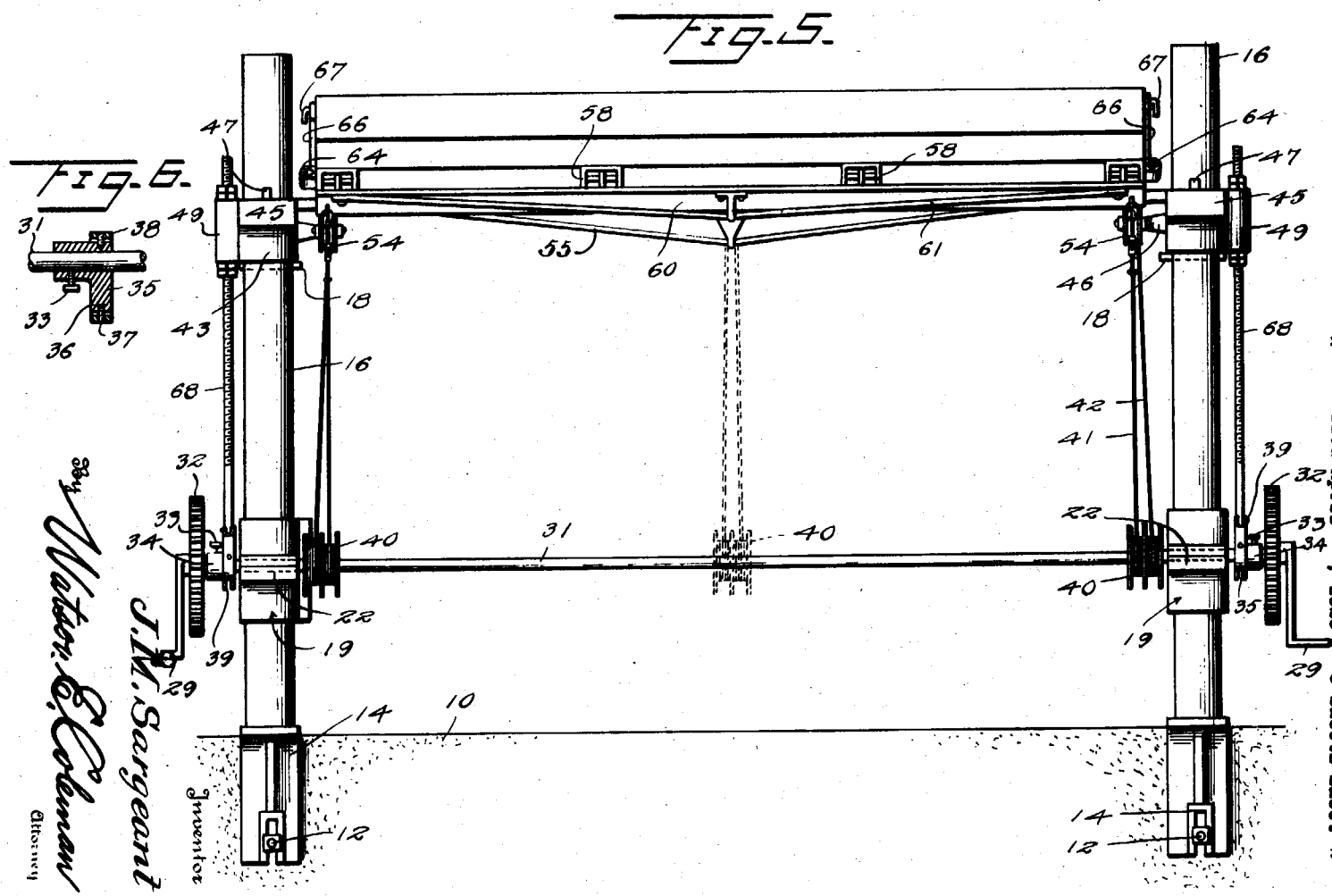
Inventor
J. M. Sargeant
By Watson E. Coleman
Attorney Jan. 17, 1928.
J. M. SARGEANT
Re. 16,853
APPARATUS FOR CONSTRUCTING THIN CONCRETE WALLS AND ERECTING THE SAME
Original Filed April 18, 1925 3 Sheets-Sheet 3
Fig. 7.
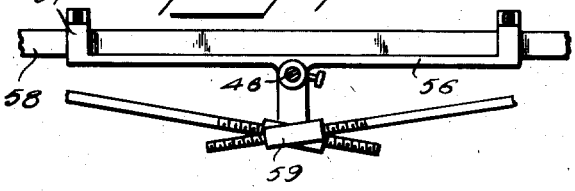
Fig. 10.
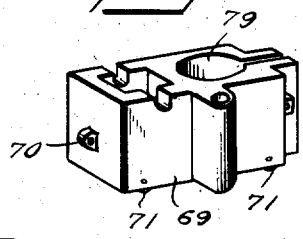
Fig. 9.
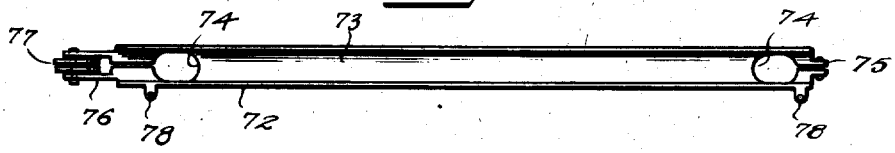
Fig. 8.
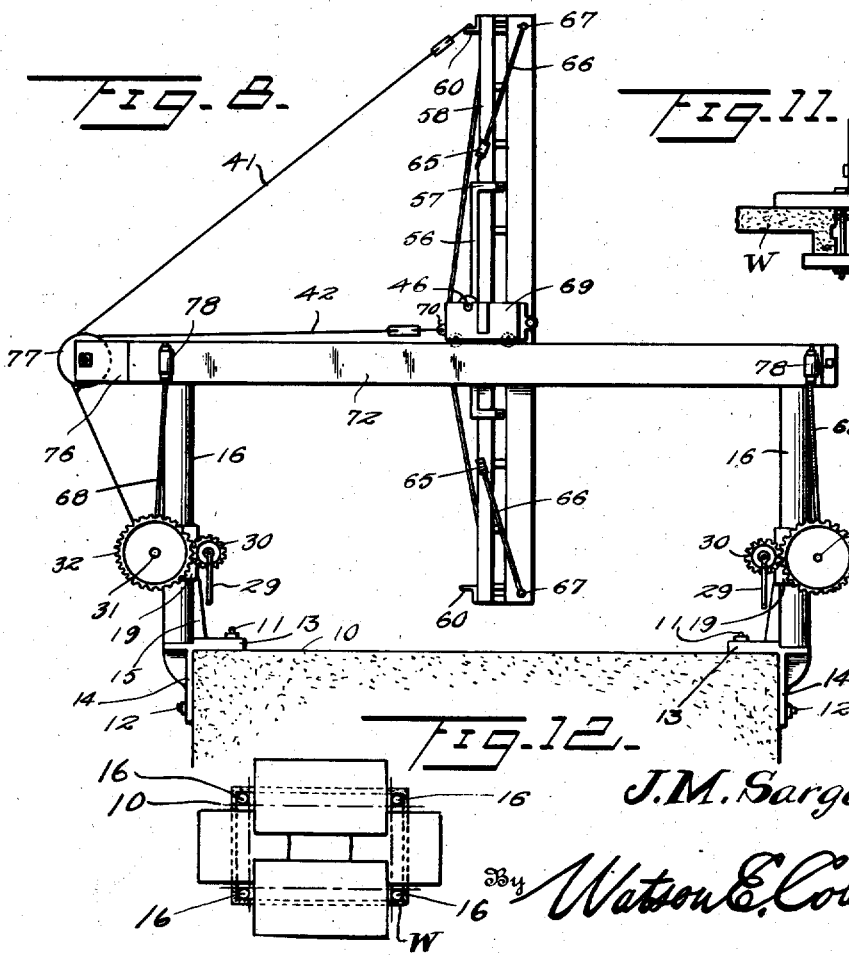
Fig. 11.
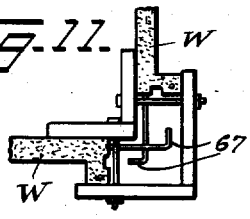
Fig. 12.
Inventor
J. M. Sargeant
By Watson E. Coleman
Attorney Reissued Jan. 17, 1928. Re. 16,853

UNITED STATES PATENT OFFICE.

JOHN M. SARGEANT, OF ELMIRA, NEW YORK.

APPARATUS FOR CONSTRUCTING THIN CONCRETE WALLS AND ERECTING THE SAME.

Original No. 1,563,798, dated December 1, 1925, Serial No. 24,173, filed April 18, 1925. Application for reissue filed March 19, 1926. Serial No. 96,106.

This invention relates to apparatus for constructing thin concrete walls and erecting the same and more particularly to a device for casting the walls in position over a base upon which the walls are to be erected.

An important object of the invention is to provide a device of this character permitting casting of the wall in a horizontal position and casting of all of the walls of a building at the same time.

A still further object of the invention is the provision of a device of this character including a pivoted platform upon which the wall to be cast is formed and supports for the platform about which the platform may be pivoted to bring the same into proper relation to the base together with means permitting the mold to be moved directly over the base for the casting operation in event there is some obstruction adjacent the base, such as a tree, another building or the like which will prevent the casting from being formed in what is its normal position or the position where the form is supported above the base in such manner that when rotated upon its supporting axis, the wall is properly positioned above the base and need only be lowered in the proper position.

A further object of the invention is to provide a structure of this character in which a wide range of adjustment may be had permitting the use of the device for casting walls of varying dimensions.

A still further object of the invention is to provide means for applying to the mold after the cement has been deposited therein a jarring action which will cause the cement to be freed from bubbles and assure a finished smooth surface on the completed wall.

These and other objects I attain by the construction shown in the accompanying drawings, wherein for the purpose of illustration is shown a preferred embodiment of my invention and wherein:—

Figure 1 is a side elevation of apparatus constructed in accordance with my invention in the position which it occupies during the time that the casting is being effected:

Figure 2 is a perspective view of the lower journal castings;

Figure 3 is a perspective of an upper journal casting;

Figure 4 is a view showing the operating shaft detached;

Figure 5 is a front elevation of the apparatus;

Figure 6 is a detail sectional view taken through the cam employed for raising and lowering the mold and for agitating the same;

Figure 7 is a perspective view showing the mounting of the frame members upon the upper shaft;

Figure 8 is a side elevation showing the manner of mounting the device when a wall must be cast which cannot be cast in its normal position due to the presence of an obstruction;

Figure 9 is a top plan view of the tracks employed when the apparatus is employed as shown in Figure 8;

Figure 10 is a view of the upper journal castings employed at this time;

Figure 11 is a detail view showing the type of joint which will be employed in joining the walls after the formation thereof:

Figure 12 is a diagrammatic plan view showing the relation of the molds when all four walls are simultaneously cast over the base.

Referring now more particularly to the drawings, the numeral 10 designates a base. Such a base with which the apparatus is to be employed in the process of formation preferably has embedded therein bolts 11 protruding above the base at each corner and bolts 12 protruding through the side of the base at each corner and having a predetermined position with relation to the bolts 11. These bolts are adapted to extend through slots formed in horizontally and vertically extending flanges 13 and 14 of a post socket or retainer 15 so that this socket and the circular post 16 which it supports may be rigidly secured to the base. A socket 15 and post 16 are arranged at each corner of the base. These posts may, of course, be otherwise supported at the ground or near the corners of the base, when desired. The post 16 is provided adjacent its upper end with vertically spaced horizontally directed openings 17 for the reception of a retaining pin 18, the purpose of which will soon become obvious.

Mounted upon each post adjacent the lower end thereof is a journal casting 19 including a vertical tubular boss 20 split and eared at one side, as indicated at 21, so that it may be clamped in both vertical position and in a rotatably adjusted position upon the post. Each journal casting has projecting from opposite sides thereof bearings 22, 23. The bearing 23 is notched, as at 24, to provide two sections having bearing grooves 25 for the reception of a shaft 26 at opposite sides of a ratchet wheel 27 secured to the shaft. Pivoted to the journal casting above the notch is a dog 27[a] for coaction with the ratchet wheel 27. Opposite ends of the shaft 26 are squared, as at 26[a] for the reception of a wrench 29 by means of which the shaft may be rotated. The shaft has additionally secured thereto a pinion 30, the purpose of which will presently appear.

In applying the journal castings 19 to the post 16, they are arranged in pairs, the bearings 22 of each pair aligning for the reception of a shaft 31. It will, of course, be obvious that since the journal castings 19 are rotatable upon the supports, by rotating these castings, the corresponding journal castings of the pair may be aligned for the reception of the shaft 31. This rotatable feature facilitates simultaneous casting of four walls and the handling of the molds, as hereinafter described. The shaft 31 has a gear 32 meshing with the pinion 30 so that the shaft 31 may be rotated from the shaft 26 and, if desired, held in an adjusted position. The shaft 31 adjacent each end thereof has secured thereto by means of a set-screw 33 the hub 34 of an eccentric 35. The eccentric 35 is provided in its outer surface with a groove 36 in which operate pins 37 extending through the eccentric strap 38. This eccentric strap has a pair of ears 39, the purpose of which will hereinafter appear.

The shaft has furthermore secured thereto a cable drum 40 having two cables 41 and 42 oppositely wound thereon. An upper journal casting 43 is provided on each post 16. This journal casting is split and eared, as at 44, so that it may be secured in adjusted positions upon the post and has projecting outwardly from one side thereof a journal 45 for the reception of a shaft 46 to which is secured collars 47 operating in recesses 48 formed in the journals 45 to prevent longitudinal movement of the shaft. Each upper journal casting has secured to one face thereof when in properly applied position an ear 49 having a vertically directed opening 50, this opening aligning with the eccentric 35 applied to the adjacent end of the shaft 31 and to the opposite face thereof an ear 51 having a horizontally disposed opening 52 for the reception of a rod 53 having at its outer end a pulley 54 aligning with the drum 40 of the shaft 31, for a purpose presently to appear.

The shaft 46 is longitudinally trussed, as indicated at 55, and has mounted thereon at spaced intervals channel supports 56 each having means 57 for receiving and clamping in position a transversely extending channel bar 58 and adjustable means for trussing, generally designated at 59, for trussing such channel bar. The outer ends of the channel bars are connected by longitudinally extending bars 60 suitably trussed, as indicated at 61. The connections between the channel bar supports and the shaft 46 are adjustable and the connection between the bars 58 and 60 are likewise adjustable so that the size of the platform provided may be adjustably altered. Upon this platform is built the mold from which the wall is to be formed and in the building of this mold, care is taken that the mold is of less length than the side of the base to which it is applied, joints between the formed walls W being obtained in a well known manner, generally illustrated in Figure 11. The frame built upon the shaft 46 and seating on the irons 58 and 60 is provided at opposite sides thereof and at each end with means for attaching to the frame the end of the cables 41 and 42, as indicated at 62.

This frame is further provided with means whereby the ends of diverging rods 63 secured to the ears 39 of the eccentric strap 38 may be attached thereto. These rods, as indicated at 64, are adjustable as to length and are intended to rock the mold platform after the charge is placed therein. The cable connections are employed for rotating the platform about its axis and the arm 53 and pulley 54 serve to engage the upper end of the cable as the platform is rotated and tension the same during the rotating movement. Means are further provided for connecting the molded wall to the frame formed by the rods 58 and 60. These means include supports 65 carried by the frame and receiving one end of an eye bolt 66, the eye of which is engaged over one end of the projecting reinforcing rods 67 commonly employed with the type of a wall jointing construction above referred to and illustrated in Figure 11. These connections prevent slipping of the formed wall upon the mold as the mold is being tilted.

In setting up the frame, the posts 16 are bolted securely to the corners of the base. The lower castings 19 are placed upon the posts and then upper castings 43 are so positioned on the posts that the distance from the top of the base to the top of the proposed frame will about equal one half the height of the wall to be molded. A convenient means for adjusting the castings 43 is provided in the rod 68, the nuts of which may be vertically shifted to raise or lower the castings. At this time, the eccentric will merely act as a support for the rod. The purpose of this is the maintenance of the frame as nearly as possible in a balanced position. The castings 56, 59, are then slipped upon the shaft 46, the collars 47 placed on this shaft and the shaft placed in position with the ends thereof journaled in the bearings 45. A seven-eighths of an inch board is now laid upon the base between the posts and the channel bars 58 slipped into the guides 56 while in a vertical position and the ends of these channel bars are brought into engagement with the seven-eighths of an inch board. They are then secured in position and while vertically disposed are in the exact position which they will occupy when the completed wall is ready to be lowered in position upon the base.

The castings 56, 59, are then attached rigidly to the shaft with the journal bars properly spaced. The braces 60 are then placed in position and after these braces are placed, the ropes 41, 42, are attached to the frame. The seven-eighths of an inch board is now removed and the frame rotated by rotating the shaft 31 until this frame is in a horizontal position and ready to receive the mold to be built thereon. The ends of the channel bars 58 will provide a guide indicating the proper position of the foot end of this mold.

The mold is then partially filled with cement. The rods 63 are now employed with the eccentric strap to rock the mold and, if desired, supports may be placed under opposite sides of the mold against which the mold will be jarred as it is rocked by these rods so that a thorough shaking up of its contents occurs, releasing therefrom any trapped air, and permitting the cement to cleanly and smoothly engage against the face of the mold. The reinforcing rods are then placed in position in the usual manner, the rod 66 engaged with one of these reinforcing rods, as above described, and the remaining cement placed in the mold. When the concrete has set, it is merely necessary to employ the cables 41, 42, for rotating the structure upon its axis and the eccentric rod 68 for lowering the wall in position upon the base. Before the wall is dropped to its lowermost position, cement or a similar binding agent may be placed between the base and the lower face of the wall for bonding the same. It will, of course, be understood that the rod 68 is removed when the rods 63 are being employed or vice versa. The cables 41 and 42 can, however, be left attached to the mold while either of the rods 63 or rod 68 are being employed, but when the cables are being employed, it is necessary that both the rods 63 and 68 be disconnected and the upper journal castings clamped in position upon the posts by the securing elements thereof.

Where four walls are to be simultaneously cast above the base, a pair of the upper journal castings 43 are applied to each post and a single lower journal casting 19 applied to each post. The upper journal castings 43 which are to support molds at selected opposite sides of the base are arranged at a convenient height upon their supports 16 and are preferably disposed below the level of the journal castings 43 which are to support the molds for the remaining walls, are more clearly shown in Figure 1. The upper set of journal castings 16 is then adjusted, as described above, and the completed molds are then all filled and the walls contained therein are allowed to set. Instead of employing the process just described, two molds at opposite sides of the base may be filled, vibrated to insure proper settling of the contents of the mold and then lowered to the lower position, as suggested in dotted lines in Figure 1. The second set of molds is then placed in position, filled and vibrated. In vibrating the second set of molds, the use of but one of the set of rods 63 will be possible. After setting of the walls, if the shafts 46 are arranged inwardly of the base, as suggested in Figure 12, the upper molds which are arranged at the proper level are rotated and their walls seated in the manner above described. The lower journal castings 19 are then rotated so that each journal casting of each pair aligns with the corresponding journal casting of the other pair and the shafts placed in their new positions. The lower set of upper journal castings is then released and shifted upwardly to the proper height or to a height permitting the rotation of its mold above the base. The shaft can then be employed for lowering these journal castings in the manner above described. If the shafts 46 are positioned outwardly of the base, as illustrated in Figure 1 of the drawings, the lower molds are arranged at the proper level and are first shifted to the proper position, and the upper molds then adjusted and rotated to bring them into proper position above the base. It will, of course, be obvious that in shifting molds arranged, as disclosed in Figure 12, the cable drum employed for shifting the mold will have to be arranged at the center of the shaft 31, as indicated in dotted lines in Figure 2.

It will be obvious that in the method first described, the mold, when in horizontal position, projects beyond the sides of the base and it will also be obvious that this will sometimes be impossible, due to the presence of some obstruction adjacent the base. Where this occurs, modified upper journal castings are provided, such as are illustrated in Figure 10 at 69. These castings are of the same construction as the castings 43 with the exception of the fact that they are provided upon their outer ends with a cable receiving eye 70 and upon their lower surfaces with rollers 71. Before these journal castings are placed in position upon the posts, each post of the pair is connected with the opposed post of the other pair by a track 72 having a grooved upper face 73, in the grooves of which the rollers 71 operate. This track has openings 74 at its ends for the reception of the posts and is split and eared at its opposite ends, as indicated at 75 and 76, so that it may be clamped upon the posts. The ears at 76, in addition to providing a means for constricting the adjacent ends of the opening 74 to provide the clamping action, also serve to provide a pivotal support for a cable guide pulley 77. The outer faces of the tracks have formed thereon ears 78 for the reception of the eccentric rods 68 so that these tracks may be raised and lowered, after the manner of raising and lowering the upper journal castings 43 above described.

In the use of this form of the device, the frame is built, as above described, and supported in the same manner from the journal castings 69 but after building the frame, the journals are moved to the center of the track so that the mold is positioned entirely over the base. This frame may then be moved to a vertical position and shifted longitudinally of the track by the connecting cable 41 or 42 to the ear 70 until the openings 79 of the journal castings 69 align with the posts. The entire track is then lowered until the frame is properly positioned. The openings 74 of the track are elongated longitudinally to take care of a slight misplacement of the opposed post of the other pair. The sheave 77 is preferably a double sheave so that the second cable 41 or 42 may be attached to the frame, as shown in Figure 8.

I am aware that it has been heretofore proposed to support a frame from a base so that this frame may be rotated or vertically adjusted, but all of these devices with which I am familiar make no provision for agitating the frame or for compensating for interference by obstruction so that in event there is obstruction, they become inoperative. I do not wish to be understood as limiting myself to the specific structure hereinbefore set forth for this structure may obviously be modified to a certain extent without in any manner departing from the spirit of my invention.

I claim:—

1. In combination with a permanent wall foundation, spaced supports extending upwardly from said foundation, upper and lower journal castings carried by each support, a framework supported from the upper journal castings for oscillation to a horizontal or vertical position, a shaft journaled in the lower journal castings and means for connecting said shaft with said framework for raising and lowering the framework or to rock the framework upon its pivot.

2. In combination with a permanent wall foundation, spaced supports extending upwardly from said foundation, upper and lower journal castings carried by each support, a framework supported from the upper journal castings for oscillation to a horizontal or vertical position, a shaft journaled in the lower journal castings, means for connecting said shaft with said framework for raising and lowering the framework or to rock the framework upon its pivot and means connecting said shaft and framework for oscillating the framework about its pivot.

3. In combination with a permanent wall foundation, spaced supports extending upwardly from said foundation, upper and lower journal castings carried by each support, a mold supporting framework supported from the upper journal castings for oscillation to a horizontal or a vertical position, a shaft journaled in the lower journal castings, an eccentric carried by said shaft, means for rotating said shaft, a strap surrounding the eccentric, means for connecting said strap to said framework adjacent the outer edges thereof to thereby permit oscillation of the framework from the eccentric and means for connecting said strap to the upper journal casting to thereby permit raising or lowering of the upper journal casting and the framework supported thereby.

4. In combination with a permanent wall foundation, spaced supports extending upwardly from said foundation, upper and lower journal castings carried by each support, a mold supporting framework supported from the upper journal castings for oscillation to a horizontal or a vertical position, a shaft journaled in the lower journal castings, an eccentric carried by said shaft, means for rotating said shaft, a strap surrounding the eccentric, means for connecting said strap to said framework adjacent the outer edges thereof to thereby permit oscillation of the framework from the eccentric and means for connecting said strap to the upper journal casting to thereby permit raising or lowering of the upper journal casting and the framework supported thereby, a double cable drum mounted on said shaft and having a pair of cables oppositely wound thereon and connectible at their ends with opposite sides of said framework.

5. In combination with a permanent wall foundation, spaced supports extending upwardly from said foundation, upper and lower journal castings carried by each support, a mold supporting framework supported from the upper journal castings for oscillation to a horizontal or a vertical position, a shaft journaled in the lower journal castings, an eccentric carried by said shaft, means for rotating said shaft, a strap surrounding the eccentric, means for connecting said strap to said framework adjacent the outer edges thereof to thereby permit oscillation of the framework from the eccentric, means for connecting said strap to the upper journal casting to thereby permit raising or lowering of the upper journal casting and the framework supported thereby, a double cable drum mounted on said shaft and having a pair of cables oppositely wound thereon and connectible at their ends with opposite sides of said framework and means for locking the shaft in rotatably adjusted positions.

6. In combination with a permanent wall foundation, spaced supports extending upwardly from said foundation, upper and lower journal castings carried by each support, a mold supporting framework supported from the upper journal castings for oscillation to a horizontal or a vertical position, a shaft journaled in the lower journal castings, an eccentric carried by said shaft, means for rotating said shaft, a strap surrounding the eccentric, means for connecting said strap to said framework adjacent the outer edges thereof to thereby permit oscillation of the framework from the eccentric, means for connecting said strap to the upper journal casting to thereby permit raising or lowering of the upper journal casting and the framework supported thereby, a short shaft carried by each lower journal casting, a gear on each short shaft meshing with the first named shaft, a ratchet wheel carried by the short shaft, a pawl carried by the journal casting and engaging the ratchet wheel and a gear carried by each short shaft and meshing with gears carried by the first named shaft.

7. In combination with a permanent wall foundation, spaced pairs of supports extending from said foundation, lower journal castings carried by each support, shafts having their ends journaled in the lower journal castings of corresponding supports of the pairs, a track supported from the supports of each pair and extending therebetween and horizontally disposed, means for connecting said tracks and shafts whereby said tracks may be vertically adjusted by rotation of the shafts, an upper journal casting supported from each pair of tracks, each journal casting having an opening for the reception of a support of the pair supporting the track upon which it is disposed, a shaft supported for oscillation and against longitudinal movement from said upper journal castings and a mold supporting framework carried by said shaft.

8. In combination with a permanent wall foundation, spaced pairs of supports extending from said foundation, lower journal castings carried by each support, shafts having their ends journaled in the lower journal castings of corresponding supports of the pairs, a track supported from the supports of each pair and extending therebetween and horizontally disposed, means for connecting said tracks and shafts whereby said tracks may be vertically adjusted by rotation of the shafts, an upper journal casting supported from each pair of tracks, each journal casting having an opening for the reception of a support of the pair supporting the track upon which it is disposed, a shaft supported for oscillation and against longitudinal movement from said upper journal castings, a mold supporting framework carried by said shaft, and means for connecting one of the first named shafts with said framework to rotate the framework and the last named shaft.

9. In combination with a permanent wall foundation, spaced pairs of supports extending from said foundation, lower journal castings carried by each support, shafts having their ends journaled in the lower journal castings of corresponding supports of the pairs, a track supported from the supports of each pair and extending therebetween and horizontally disposed, means for connecting said tracks and shafts whereby said tracks may be vertically adjusted by rotation of the shafts, an upper journal casting supported from each pair of tracks, each journal casting having an opening for the reception of a support of the pair supporting the track upon which it is disposed, a shaft supported for oscillation and against longitudinal movement from said upper journal castings, a mold supporting framework carried by said shaft, and means for connecting one of the first named shafts with said framework to oscillate the framework and the last named shaft or to shift the framework and upper journal castings longitudinally of said tracks.

10. In combination, spaced vertical supports, upper and lower journal castings carried by each support, a framework supported from the upper journal castings for oscillation to a horizontal or vertical position and means supported from the lower journal castings for vertically adjusting the upper journal castings.

11. In combination, spaced vertical supports, upper and lower journal castings carried by each support, a framework supported from the upper journal castings for oscillation to a horizontal or vertical position, means supported from the lower journal castings for vertically adjusting the upper journal castings and means for rocking the framework upon its pivot.

12. In combination, spaced vertical supports, upper and lower journal castings carried by each support, a framework supported from the upper journal castings for oscillation to a horizontal or vertical position and an operative connection between the upper and lower journal castings for vertically shifting the upper journal casting upon the support.

13. In combination, spaced vertical supports, upper and lower journal castings carried by each support, a framework supported from the upper journal castings for oscillation to a horizontal or vertical position, a shaft journaled in the lower journal castings and means for connecting said shaft with said framework for raising and lowering the framework.

14. In combination, spaced vertical supports, upper and lower journal castings carried by each support, a framework supported from the upper journal castings for oscillation to a horizontal or vertical position, a shaft journaled in the lower journal castings and means for connecting said shaft with said framework to rock the framework upon its pivot.

15. In combination, spaced vertical supports, upper and lower journal castings carried by each support, a framework supported from the upper journal castings for oscillation to a horizontal or vertical position, a shaft journaled in the lower journal castings, means for connecting said shaft with said framework for raising and lowering the framework and means connecting said shaft and framework for oscillating the framework about its pivot.

16. In combination, spaced vertical supports, upper and lower journal castings carried by each support, a framework supported from the upper journal castings for oscillation to a horizontal or vertical position, a shaft journaled in the lower journal castings, means for connecting said shaft with said framework to rock the framework upon its pivot and means for connecting the framework to the shaft for oscillating the framework about its pivot.

17. In combination, spaced vertical supports, upper and lower journal castings carried by each support, a framework supported from the upper journal castings for oscillation to a horizontal or vertical position, a shaft journaled in the lower journal castings, means for connecting said shaft with said framework to rock the framework upon its pivot, means for connecting the framework to the shaft for oscillating the framework about its pivot and means for vertically adjusting said upper journal castings.

18. In combination, spaced vertical supports, upper and lower journal castings carried by each support, a framework supported from the upper journal castings for oscillation to a horizontal or vertical position, a shaft journaled in the lower journal castings, a drum upon the shaft and cables oppositely wound upon the drum and adapted for engagement with the edges of said framework.

19. In a wall molding device, spaced supports, a journal casting vertically adjustable on each support, each casting including means for clampingly engaging its support whereby it may be secured in adjusted positions, a mold frame support mounted in said castings and means for supporting and vertically shifting the journal castings when the clamping means thereof are released.

20. In a wall molding device, spaced supports, a journal casting vertically adjustable on each support, each casting including means for clampingly engaging its support whereby it may be secured in adjusted positions, a mold frame support mounted in said castings, means for supporting and vertically shifting the journal castings when the clamping means thereof are released, the journal casting having a vertically directed eye, said means for supporting the journal casting including a rod having its upper end threaded and nuts adjustable upon the rod for engagement with the ear.

21. In a wall molding device, spaced supports, a journal casting vertically adjustable on each support, each casting including means for clampingly engaging its support whereby it may be secured in adjusted positions, a mold frame support mounted in said castings, means for supporting and vertically shifting the journal castings when the clamping means thereof are released, the journal casting having a vertically directed eye, said means for supporting the journal casting including a rod having its upper end threaded, nuts adjustable upon the rod for engagement with the eye and means for bodily vertically shifting said rod.

22. In combination with a permanent wall foundation, a pair of vertical supports associated therewith, journals carried by said supports, a shaft mounted within the journals and a mold-supporting framework carried by said shaft and adjustable transversely of the shaft.

23. In combination with a permanent wall foundation, a pair of vertical supports associated therewith, journals carried by said supports, a shaft mounted within the journals, a mold-supporting framework carried by said shaft and adjustable transversely of the shaft and means associated with the supports for oscillating the framework about its axis.

24. In combination with a permanent wall foundation, a pair of vertical supports associated therewith, journals carried by said posts, a shaft mounted within the journals, a mold-supporting framework carried by said shaft and adjustable transversely of the shaft and means associated with the supports for oscillating the framework about its axis and for vertically adjusting the journals of the framework upon the supports.

25. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports, end bars paralleling the shaft and connecting the ends of the transversely extending bars, means for oscillating the framework thus provided with the shaft as an axis to position the framework vertically or horizontally and a mold supported from the framework.

26. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports, end bars paralleling the shaft and connecting the ends of the transversely extending bars, means for oscillating the framework thus provided with the shaft as an axis to position the framework vertically or horizontally, a mold supported from the framework, the transverse supports at the opposite side of the shaft from the transverse bars having eyes and truss rods connecting the outer ends of the bars with said eyes.

27. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports, end bars paralleling the shaft and connecting the ends of the transversely extending bars, means for oscillating the framework thus provided with the shaft as an axis to position the framework vertically or horizontally and a mold supported from the framework, the transverse supports being adjustable longitudinally of the shaft and the transverse bars being adjustable in their connections with the end bars to thereby permit variation of the size of the platform provided.

28. In combination with a permanent wall foundation, a pair of vertical supports associated therewith, journals carried by said supports, a shaft mounted within the journals, a mold-supporting framework carried by said shaft and adjustable transversely of the shaft and eccentric means operatively connecting the shaft and the supports for vertically adjusting the shaft with relation to the supports.

29. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports and end bars paralleling the shaft and connecting the ends of the transversely extending bars.

30. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports, end bars paralleling the shaft and connecting the ends of the transversely extending bars, said transversely extending supports including means clampingly engaging the transverse bars and through which the bars are slidable when released and a mold supported from the transverse and end bars.

31. In combination with a permanent wall foundation, a pair of vertical supports associated therewith, journals carried by said supports, a shaft mounted within the journals and a mold-supporting framework carried by said shaft and adjustable transversely of the shaft, each of said journals having an opening for the passage of the associated support and a vertically directed eye and means engaging in the eye of each journal for vertically adjusting the journal.

32. In a wall molding device, spaced supports, a journal casting vertically adjustable on each support, each casting including means whereby it may be secured in adjusted positions, a mold frame support mounted for oscillation in said castings and means for supporting and vertically shifting the journal castings when the securing means thereof are released.

33. In a wall molding device, spaced supports, a journal casting vertically adjustable on each support, means for securing the castings in adjusted positions upon its support, a mold frame support oscillatably supported from said castings and means for supporting and vertically shifting the journal castings when the securing means thereof are released.

34. In combination, spaced vertical supports, journals carried by and vertically adjustable upon each support, means for securing the journals in adjusted position, a shaft mounted in the journals, transversely extending supports carried by the shaft at points spaced longitudinally thereof, transversely extending bars adjustably supported by the transverse supports, means for oscillating the framework thus provided with the shaft as an axis to position the framework vertically or horizontally and a mold supported from the framework.

35. In combination with a permanent wall foundation, a pair of vertical supports associated therewith, journals carried by said posts, a shaft mounted in the journals, a mold-supporting framework carried by said shaft and adjustable transversely of the shaft and means operatively connecting the shaft and the supports for vertically adjusting the shaft with relation to the supports.

36. In combination, vertical supports, upper journals on each support, a framework support oscillatable in the journals, transversely extending bars adjustable longitudinally and transversely of the support and means to secure the same to the framework support.

37. In combination, vertical supports, castings vertically adjustable on each support, a framework support supported from the castings, transversely extending bars adjustable longitudinally and transversely of the support and means for securing the bars to the framework support.

38. In wall molding apparatus and in combination, a pair of spaced vertical supports, a horizontal support supported at its ends from the vertical supports and a mold-supporting framework carried by and adjustable transversely of the horizontal support, said mold-supporting framework being oscillatably shiftable from a horizontal mold filling position to a vertical wall discharging position.

39. In wall molding apparatus and in combination, a pair of spaced vertical supports, a horizontal support supported at its ends from the vertical supports, a mold-supporting framework carried by and adjustable transversely of the horizontal support, said mold-supporting framework being oscillatably shiftable from a horizontal mold filling position to a vertical wall discharging position and means associated with the supports for vertically adjusting the ends of the horizontal support.

40. In wall molding apparatus and in combination, a pair of spaced vertical supports, a journal casting vertically and rotatably adjustable upon the supports, a horizontal support supported from said journal castings and a mold-supporting framework carried by the horizontal support.

41. In wall molding apparatus and in combination, spaced pairs of vertically directed supports, a horizontally disposed track supported from and extending between the supports of each pair, a transversely extending horizontal shaft, a mold-supporting framework carried by said horizontal shaft and means supporting the ends of the shaft from said tracks adjustable along said tracks.

42. In a wall molding apparatus and in combination, a spaced pair of vertical supports, a horizontally disposed shaft associated near its ends with each vertical support, a mold-supporting platform carried by said shaft and rotatable means mounted upon the supports to oscillate the shaft and the structure supported thereby from a horizontal mold-filling position to a vertical wall-discharging position.

43. In a wall molding apparatus and in combination, a spaced pair of vertical supports, a casting to support a horizontal support carried by each vertical support, a horizontal support oscillatably supported from said castings, a mold-supporting framework carried by the horizontal support, means associated with the vertical supports to control the oscillation of said framework from a horizontal mold-filling position to a vertical wall-discharging position, and means to tension the control means.

44. In wall molding apparatus and in combination with a permanent wall foundation, a spaced pair of vertically directed guide supports, a casting to support a horizontal support carried by each guide support, a horizontal support oscillatably associated at its ends with each casting, a framework supported from said horizontal support and means associated with the foot end of said framework to secure an adjustment between an end of said framework and the foundation.

45. In a wall molding device and in combination with a base, a pair of spaced vertical supports, a horizontal support, a casting carried by each vertical support for supporting an end of the horizontal support, transversely extending supports carried by the horizontal support and members adjustable longitudinally of the transversely extending members and coacting therewith to provide a mold support.

46. In a wall molding apparatus and in combination, spaced, vertically directed guide supports, a casting vertically guided by each guide support, means to secure each casting in vertically adjusted positions on its support, a horizontal support associated near its ends with said castings, a mold-supporting platform carried by the horizontal support, and means associated with the vertical supports and said castings to gradually lower the castings and the molding platform supported thereby when the securing means are released.

47. In a wall molding apparatus and in combination, a spaced pair of vertically directed guide posts, a journal casting guided vertically wholly by said guide post, each journal casting including means for clampingly engaging its guide whereby it may be secured in adjusted positions, a horizontal support supported from said journal castings and a mold-supporting framework carried by the horizontal support.

48. In wall molding apparatus and in combination, a spaced pair of vertically directed guide posts, a horizontal support associated near its ends with each vertical guide post, and guided vertically by said posts, a mold-supporting framework carried by the horizontal support and adjustable transversely of the support, said mold-supporting framework being oscillatably shiftable from a horizontal mold-filling position to a vertical wall-discharging position, and means to support and vertically shift the horizontal support.

49. In combination, a spaced pair of vertically directed supports, a journal adapted to support a molding platform for oscillation from a horizontal mold-filling position to a vertical wall-discharging position carried by each support and a molding platform transversely adjustable of the castings.

50. In wall molding apparatus and in combination, a spaced pair of vertically directed journal guide supports, a molding platform disposed for oscillation between said supports, a casting adapted to support said molding platform for oscillation carried by each support, said castings being vertically adjustable of the supports and the platform when said platform is in a vertical wall-discharging position.

51. In a wall molding apparatus and in combination, a spaced pair of vertically directed guide posts, a journal carried by each post and guided vertically wholly by said posts, each journal having a vertically directed opening for the passage of its guide, a horizontal support oscillatably supported from said journals and a mold-supporting framework supported from the horizontal support.

52. In a wall molding apparatus and in combination, a spaced pair of vertically directed supports, a casting to support a horizontally disposed shaft carried by each vertical support, a shaft supported from said castings, a mold-supporting framework carried by said shaft and eccentric means associated with the shaft and its supports for vertically shifting the shaft with relation to its supports.

53. In combination with a permanent wall foundation, a pair of vertical supports associated therewith, a shaft-supporting journal carried by each support, a shaft supported from said journals, a mold-supporting framework carried by said shaft and adjustable transversely of the shaft and eccentric means operatively connecting the shaft and its supports for vertically adjusting the shaft with relation to its supports.

In testimony whereof I hereunto affix my signature.

JOHN M. SARGEANT.